Figure 1:
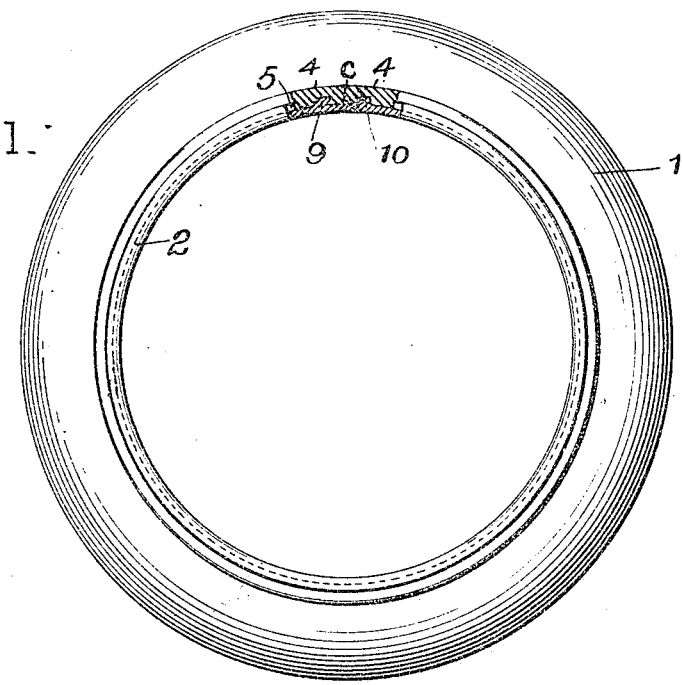

No. 831,586. PATENTED SEPT. 25, 1906.
F. A. WILCOX.
RIM OF VEHICLE WHEELS.
APPLICATION FILED JUNE 14, 1906.

WITNESSES:
J. Herbert Bradley
William H. Wilson

INVENTOR
Frank Albert Wilcox
by Christy and Christy
Atty S.

UNITED STATES PATENT OFFICE.

FRANK ALBERT WILCOX, OF AKRON, OHIO.

RIM OF VEHICLE-WHEELS.

No. 831,586.　　　　Specification of Letters Patent.　　　Patented Sept. 25, 1906.

Application filed June 14, 1906. Serial No. 371,756.

*To all whom it may concern:*

Be it known that I, FRANK ALBERT WILCOX, a citizen of the United States, residing at Akron, in the county of Summit and State of Ohio, have invented or discovered a certain new and useful Improvement in Rims of Vehicle-Wheels, of which improvement the following is a specification.

My invention relates to the construction of rims for the wheels of vehicles; and the object of my improvement is a tire-holding rim of the "G. and J." type which will be at once separable and secure. A wheel-rim of the G. and J. type is one which includes a medial web and laterally-arranged flanges for engaging and holding in position a tire applied thereto. The features thus generally defined are illustrated in the drawings presently to be referred to. Rims of this general character have heretofore been devised in which one or both of the flanges have been detachable from the web and securable thereon. My present invention concerns such a rim with a detachable flange, but provided with securing means more efficient than have heretofore been employed.

Figure 2:
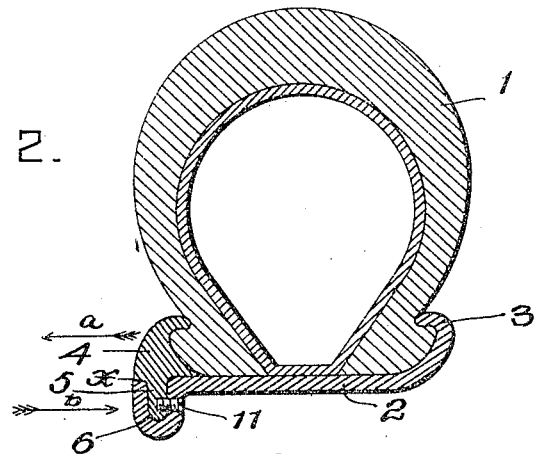
Figure 3:
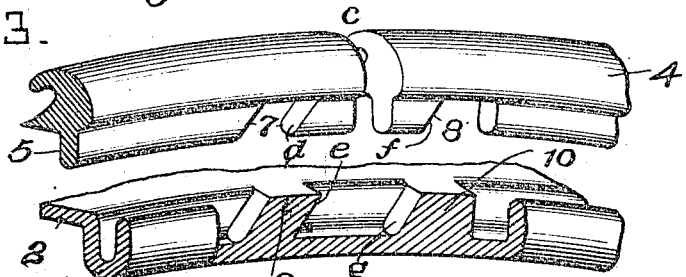

In the accompanying drawings, which form part of this specification, Figure 1 shows in side elevation, but with details shown in section, a wheel-rim embodying my improvement with a tire applied thereto. Fig. 2 is a view in transverse section and on larger scale through the rim and tire of Fig. 1, and Fig. 3 shows in perspective, with portions broken away, the several parts of the rim detached.

Parts which are repeated in the several figures bear the same reference characters in each case.

As shown in the drawings, the rim consists of a web portion 2, provided with lateral flanges, flange 3 being integral with the web and flange 4 removable. This flange 4 is provided with a tongue 5, which extends downward—*i. e.*, toward the hub of the wheel—to engage a corresponding groove 6, formed in the edge of rim 2. The said tongue and groove are so formed that the force which in service is exerted upon the flange and which tends to separate flange and web will be resisted by the meeting of tongue and groove in a plane substantially perpendicular to the direction of the force. This is best illustrated in Fig. 2. Tire 1 in service exerts an outward thrust upon the flanges of the rim which engage it. The direction of this force is indicated by arrow *a*. This force so directed tends to drive flange 4 outward to draw the downward-extending tongue 5 from its groove 6 and by torsional movement to twist the flange from its position. This torsional movement will be exerted upon edge *x* as a center, (the outer edge of groove 6,) and while it tends to force the flange itself outward in the direction indicated by arrow *a* it tends to force tongue 5 inward in the direction indicated by arrow *b*. By so forming and disposing the contacting surfaces of tongue 5 and groove 6 that they meet in a plane substantially perpendicular to the line of displacing force I effectually guard against displacement.

Flange 4 is circular. It is preferably formed of spring-steel or other suitable material cut through at one point, as at *c*, that it may readily be applied to and removed from engagement with web 2 of the rim.

My invention concerns the means employed for preventing longitudinal displacement or "creeping" of the removable flange upon the web of the rim and consists in a construction which affords close and secure engagement of the detachable parts. In tongue 5 slots and recesses, preferably two in number, 7 and 8 are formed on either side of and adjacent to cut *c*, and corresponding detents 9 and 10, properly situated, are formed in groove 6. The forward faces—*i. e.*, the faces nearer the cut *c*—of one of these slots and of the corresponding detent, as *d* and *e*, are inclined from radial direction and slope downward and away from cut *c*. The forward faces of the other slot and its corresponding detent 8 and 10 are also inclined from radial direction and slope downward and toward cut *c*, as indicated at *f* and *g*.

In applying the flange 4 it is expanded, and slot 7 is brought into engagement with detent 9. As it comes to rest in proper place and the flange secured in the manner about to be described the inclined faces *d* and *e* form a hook engagement, securing that end of flange 4 against radial displacement. As the flange 4 comes to place slot 8 engages detent 10, and the inclined faces *f* and *g* making contact draw the flange forward longitudinally, so that when the flange is in place the cut *c* is closed, and the abutting faces of the cut make close contact. This is a feature of practical value, for it eliminates a point of wear and deterioration. When the parts are in place, they are secured against centrifugal displacement by any preferred means—as, for example, a pin 11, passing through the wall of groove 6 and into the body of tongue 5 at a point adjacent to detent 10.

I claim as my invention—

1. In a rim for a vehicle-wheel including a web portion and a discontinuous removable flange, a tongue-and-groove engagement of said web and flange, notch-and-detent engagement of said tongue and groove, such notch-and-detent engagement arranged adjacent to the opposite ends of said discontinuous ring, and said notch-and-detent engagement having inclined contacting surfaces, and means for securing said parts, substantially as described.

2. In a rim for a vehicle-wheel, including a web portion and a discontinuous removable flange, a tongue formed on the flange and a corresponding groove formed on said web portion, notches formed in said tongue of the flange adjacent to opposite ends thereof with outer faces inclined, and correspondingly-shaped detents formed in said groove, and means for securing said parts, substantially as described.

In testimony whereof I have hereunto set my hand.

FRANK ALBERT WILCOX.

Witnesses:
CHARLES BARNETT,
J. HERBERT BRADLEY.